United States Patent
Izawa et al.

(10) Patent No.: US 12,113,322 B2
(45) Date of Patent: Oct. 8, 2024

(54) WIRE HARNESS

(71) Applicant: SUMITOMO WIRING SYSTEMS, LTD., Yokkaichi (JP)

(72) Inventors: Katsutoshi Izawa, Yokkaichi (JP); Masashi Hayashi, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 482 days.

(21) Appl. No.: 17/441,511

(22) PCT Filed: Jan. 6, 2020

(86) PCT No.: PCT/JP2020/000086
§ 371 (c)(1),
(2) Date: Sep. 21, 2021

(87) PCT Pub. No.: WO2020/194980
PCT Pub. Date: Oct. 1, 2020

(65) Prior Publication Data
US 2022/0166153 A1 May 26, 2022

(30) Foreign Application Priority Data

Mar. 28, 2019 (JP) .................................. 2019-064327

(51) Int. Cl.
| | |
|---|---|
| *H01R 4/00* | (2006.01) |
| *H01B 7/00* | (2006.01) |
| *H01R 4/72* | (2006.01) |
| *B60R 16/02* | (2006.01) |

(52) U.S. Cl.
CPC ............ *H01R 4/72* (2013.01); *H01B 7/0045* (2013.01); *B60R 16/0207* (2013.01)

(58) Field of Classification Search
CPC ................................. H01R 4/72; H01R 7/0045
See application file for complete search history.

(56) References Cited

U.S. PATENT DOCUMENTS

2015/0140856 A1* 5/2015 Sato ........................ H01R 4/70
439/523

FOREIGN PATENT DOCUMENTS

| JP | 2014-049334 A | 3/2014 |
|---|---|---|
| JP | 2016-167342 A | 9/2016 |
| JP | 2017-091642 A | 5/2017 |
| JP | 2018-129924 A | 8/2018 |

OTHER PUBLICATIONS

Mar. 17, 2020 International Search Report issued in International Patent Application No. PCT/JP2020/000086.

* cited by examiner

*Primary Examiner* — Phuong Chi Thi Nguyen
(74) *Attorney, Agent, or Firm* — Oliff PLC

(57) ABSTRACT

A wire harness including: a first conductor; a second conductor electrically connected to the first conductor; and a tubular contraction tube that covers a connection between the first conductor and the second conductor, wherein a determination pattern that includes a first determination pattern that allows a first contraction rate in a radial direction of the contraction tube to be determined is printed on an outer circumferential surface of the contraction tube.

8 Claims, 6 Drawing Sheets

WIRE HARNESS

BACKGROUND

The present disclosure relates to a wire harness.

Heretofore, wire harnesses are known that are used in vehicles, and in which an end of a core wire of a coated electric wire and a connection terminal made of metal are electrically connected (see JP 2014-49334A, for example). In this type of wire harness, in order to insulate and protect a connection portion between the core wire and the connection terminal, the connection portion may be covered with a heat-contraction tube. Note that the connection terminal is connected to an electric device of the vehicle.

SUMMARY

However, when the heat-contraction tube is excessively contracted, there is a risk that the heat-contraction tube will be pressed against a corner portion or the like of the connection portion, and will break. If the heat-contraction tube breaks, this leads to a quality loss such as a decrease in the insulation reliability of the wire harness.

An exemplary aspect of the disclosure provides a wire harness that can suppress a quality loss.

A wire harness according to the present disclosure includes a first conductor; a second conductor electrically connected to the first conductor; and a tubular contraction tube that covers a connection between the first conductor and the second conductor, wherein a determination pattern that includes a first determination pattern that allows a first contraction rate in a radial direction of the contraction tube to be determined is printed on an outer circumferential surface of the contraction tube.

According to the wire harness of the present disclosure, the effect that a quality loss can be suppressed is achieved.

DETAILED DESCRIPTION OF EMBODIMENTS

Figure 1:
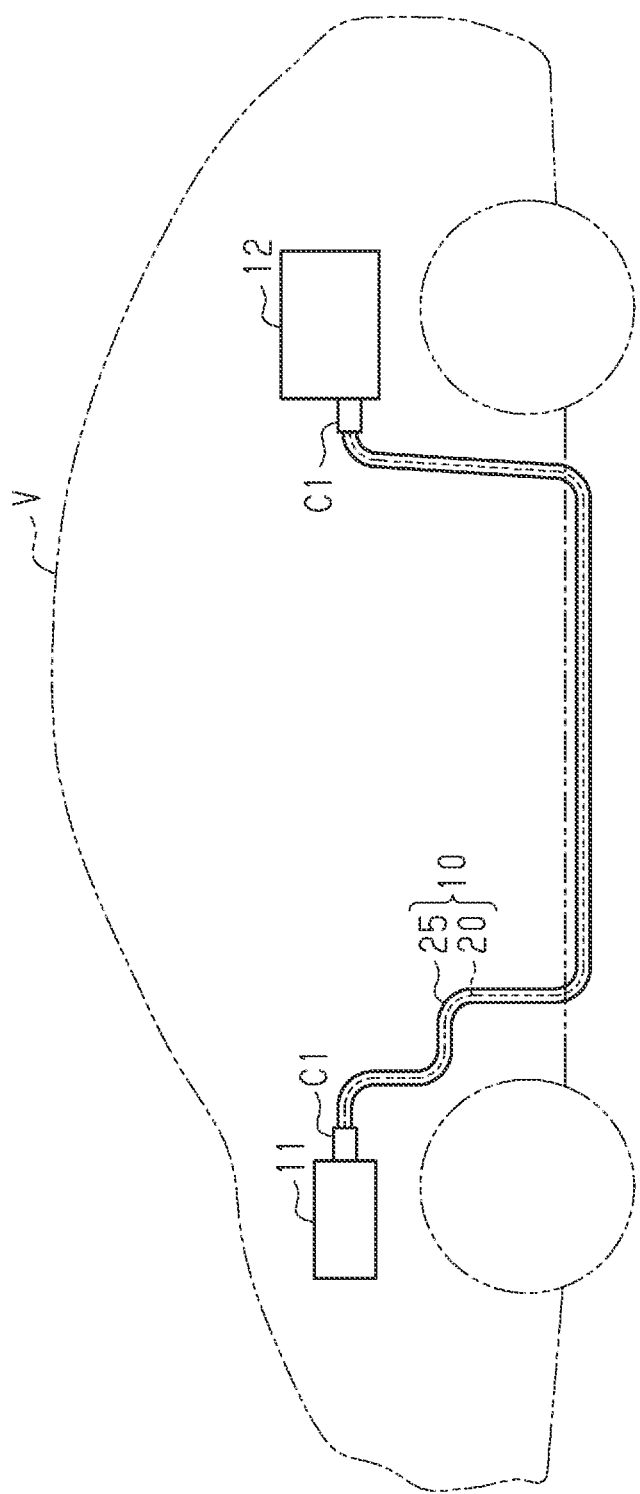
FIG. 1 is a diagram showing a schematic configuration of a wire harness according to an embodiment of the present disclosure.

First, embodiments of the present disclosure will be listed and described.

[1] A wire harness according to the present disclosure includes a first conductor, a second conductor electrically connected to the first conductor, and a tubular contraction tube that covers a connection portion between the first conductor and the second conductor, and a determination pattern that includes a first determination pattern according to which it is possible to determine a contraction rate in a radial direction of the contraction tube is printed on an outer circumferential surface of the contraction tube.

According to this configuration, the contraction rate in the radial direction of the contraction tube can be determined using the first determination pattern of the determination pattern. Therefore, it is possible to easily make a determination on a wire harness in which the contraction rate in the radial direction of the contraction tube is excessive and a wire harness in which the contraction rate in the radial direction of the contraction tube is insufficient, based on the first determination pattern. Accordingly, the insulation reliability and the waterproof property of the connection portion can be visually recognized using the first determination pattern, and thus a quality loss of the wire harness can be suppressed. Furthermore, it is possible to omit a leak inspection and the like for evaluating the waterproof property of the contraction tube, and thus improve the assembly workability of the wire harness.

[2] The determination pattern preferably includes a second determination pattern according to which it is possible to determine a contraction rate in a lengthwise direction of the contraction tube.

According to this configuration, the contraction rate in the lengthwise direction of the contraction tube can be determined using the second determination pattern of the determination pattern. Therefore, it is possible to easily make a determination on a wire harness in which the contraction rate in the lengthwise direction of the contraction tube is excessive and a wire harness in which the contraction rate in the lengthwise direction of the contraction tube is insufficient, based on the second determination pattern.

[3] The first determination pattern is a pattern in which a plurality of first patterns extending along the lengthwise direction of the contraction tube are printed at equal intervals along a circumferential direction of the contraction tube, and the second determination pattern is a pattern in which a plurality of second patterns extending along the circumferential direction of the contraction tube are printed at equal intervals along the lengthwise direction of the contraction tube.

According to this configuration, it is possible to determine the contraction rate in the radial direction of the contraction tube that has contracted, by measuring an extent to which the distance between adjacent first patterns has reduced compared with the distance before contraction. In addition, it is possible to determine the contraction rate in the lengthwise direction of the contraction tube that has contracted, by measuring an extent to which the distance between adjacent second patterns has reduced compared with the distance before contraction.

[4] The determination pattern is preferably printed on the entire outer circumferential surface of the contraction tube. According to this configuration, it is possible to determine the contraction rate in the entire circumferential direction of the contraction tube and the contraction rate in the lengthwise direction of the contraction tube over the entire length thereof.

[5] The first conductor is a core wire of an electric wire that includes the core wire and an insulating coating that coats an outer circumference of the core wire, the second conductor is a connection terminal made of metal, the core wire exposed from the insulating coating is electrically connected to the connection terminal, and the contraction tube is formed to cover a region reaching from the connection portion between the core wire and the connection terminal to an end portion of the insulating coating.

According to this configuration, it is possible to insulate and protect the connection portion between the core wire and the connection terminal using the contraction tube. Therefore, the insulation reliability and waterproof property at the connection portion between the core wire and the connection terminal can be visually recognized using the determination pattern printed on the contraction tube.

[6] It is preferable that the first conductor is a first core wire of a first electric wire that includes the first core wire and a first insulating coating that coats an outer circumference of the first core wire, the second conductor is a second core wire of a second electric wire that includes the second core wire and a second insulating coating that coats an outer circumference of the second core wire, the first core wire exposed from an end portion of the first insulating coating and the second core wire exposed from an end portion of the second insulating coating are electrically connected to each other, and the contraction tube is formed to cover a region reaching from the end portion of the first insulating coating to the end portion of the second insulating coating.

According to this configuration, it is possible to insulate and protect the connection portion between the first core wire and the second core wire using the contraction tube. Therefore, the insulation reliability and the reliability at the connection portion between the first core wire and the second core wire can be visually recognized using the determination pattern printed on the contraction tube.

[7] It is preferable that an inner circumferential surface of one end portion of the contraction tube is adhered to an outer circumferential surface of the end portion of the first insulating coating through welding, and an inner circumferential surface of the other end portion of the contraction tube is adhered to an outer circumferential surface of the end portion of the second insulating coating through welding.

According to this configuration, a gap between the contraction tube and the first insulating coating is closed, and a gap between the contraction tube and the second insulating coating is closed. Accordingly, liquid such as water is kept from invading the contraction tube from between the contraction tube and the first insulating coating and between the contraction tube and the second insulating coating.

[8] The contraction tube preferably includes a layered structure that includes a heat-contraction tube and an adhesive layer formed on an inner circumferential surface of the heat-contraction tube.

According to this configuration, it is possible to improve the adhesiveness between the heat-contraction tube and the insulating coating, etc., using the adhesive layer formed on the inner circumferential surface of the heat-contraction tube.

DETAILS OF EMBODIMENTS OF PRESENT DISCLOSURE

The following describes specific examples of a wire harness according to the present disclosure with reference to the drawings. In the drawings, some of the components may be exaggerated or simplified for the sake of convenience of description. The dimensional ratios of the components may also be different in each of the drawings. Note that the present disclosure is not limited to these examples, but is indicated by the claims, and is intended to include all modifications within the meaning and scope equivalent to the scope of the claims. The term "orthogonal" according to the present specification includes not only strictly orthogonal but also roughly orthogonal within a range in which actions and effects according to an embodiment of the present disclosure are exerted.

A wire harness 10 shown in FIG. 1 electrically connects two or more electric devices (devices). The wire harness 10 is mounted in a vehicle V such as a hybrid vehicle or an electric vehicle. The wire harness 10 electrically connects an inverter 11 installed in a front portion of a vehicle V and a high-voltage battery 12 installed rearward of the inverter 11 in the vehicle V, to each other. The wire harness 10 is routed so as to extend under the floor of the vehicle V, for example. The inverter 11 is connected to a wheel driving motor (not shown) serving as a power source for moving the vehicle. The inverter 11 generates AC power from the DC power of the high-voltage battery 12, and supplies the AC power to the motor. The high-voltage battery 12 is a battery that can supply a voltage of several hundred volts, for example.

The wire harness 10 includes one or more electric wires 20, a pair of connectors C1 attached to the two ends of each electric wire 20, and an exterior member 25 collectively surrounding the electric wires 20. One end portion of the electric wires 20 is connected to the inverter 11 via the connector C1, and the other end portion of the electric wires 20 is connected to the high-voltage battery 12 via the connector C1. The electric wires 20 are high-voltage electric wires that support high voltages and large currents, for example. The electric wires 20 may be shielded electric wires that have an electromagnetically shielded structure or non-shielded electric wires that do not have an electromagnetically shielded structure.

An exterior member 25 has an overall elongated tubular shape. One or more electric wires 20 are housed in the internal space of the exterior member 25. The exterior member 25 surrounds the outer circumference of a plurality of electric wires 20 over their entire circumferential direction, for example. The exterior member 25 protects the electric wires 20 housed therein against air-borne objects and water drops. A pipe made of metal or a resin, a protector made of a resin, a flexible corrugated tube made of rubber or the like, a waterproof cover made of rubber, or a combination thereof can be used as the exterior member 25, for example.

Configuration of Electric Wires 20

Figure 2:
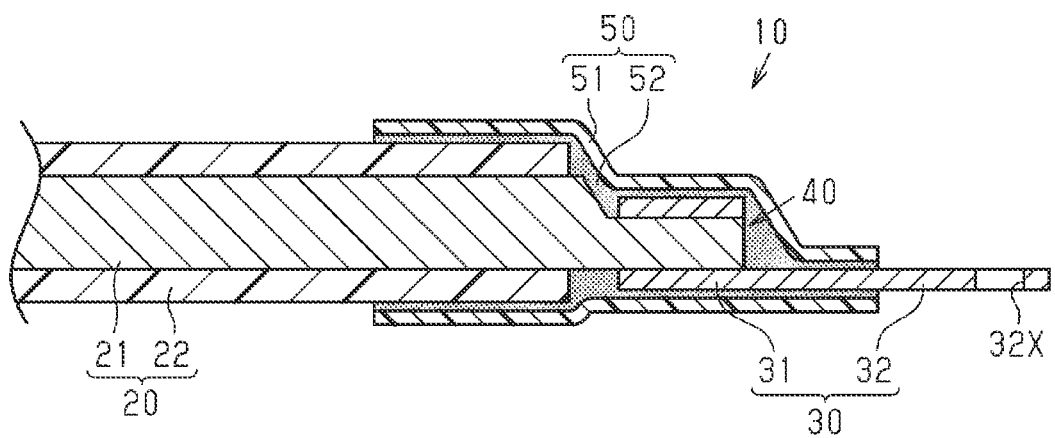
FIG. 2 is a schematic cross-sectional view showing a wire harness according to an embodiment of the present disclosure.

As shown in FIG. 2, each electric wire 20 includes a core wire 21 made of a conductor, and an insulating coating 22 that coats the outer circumference of the core wire 21. A stranded wire constituted by a plurality of metal bare wires twisted together, a columnar conductor made of a single columnar metal bar that has a solid internal structure, a tubular conductor that has a hollow internal structure, or the like can be used as the core wire 21. A combination of a stranded wire, a columnar conductor, and a tubular conductor may also be used as the core wire 21. Examples of the columnar conductor include a single core wire, a bus bar, and the like. The core wire 21 according to this embodiment is a stranded wire. A copper-based or aluminum-based metal material may be used as the material of the core wire 21, for example. The core wire 21 is formed through extrusion molding, for example.

The cross-sectional shape of the core wire 21 cut along a plane that is orthogonal to the lengthwise direction of the core wire 21 may be any shape. Accordingly, the horizontal cross section of the core wire 21 can have any shape. The horizontal cross section of the core wire 21 is formed in a circular shape, a semi-circular shape, a polygonal shape, a square shape, or a flat shape, for example. The horizontal cross section of the core wire 21 in the present embodiment is formed in a circular shape.

The insulating coating 22 coats the outer circumferential surface of the core wire 21 over the entire circumferential direction thereof, for example. The insulating coating 22 is made of an insulating material such as a synthetic resin. A synthetic resin whose major component is a polyolefin-based resin such as cross-linked polyethylene or cross-linked polypropylene can be used as the material of the insulating coating 22. A single material or a combination of two or more materials can be used as the material of the insulating coating 22 as appropriate. The insulating coating 22 may be formed by performing extrusion molding (extrusion coating) on the core wire 21, for example.

Note that, in the present specification, the expression "major component" encompasses the meaning that another component is contained within a range in which the function of the major component is not inhibited and the meaning that the content of the major component is 50 mass % or higher unless specifically stated otherwise.

An end portion of the core wire 21 is exposed from the insulating coating 22 at the end portion of the electric wire 20. At the end portion of the electric wire 20, the end portion of the core wire 21 is exposed from the insulating coating 22 as a result of the insulating coating 22 being stripped to a certain length thereof from the terminal of the electric wire 20, for example.

In the following description, a simple expression of "circumferential direction" of the electric wire 20 means the circumferential direction of the central axis line of the electric wire 20.

Figure 3:
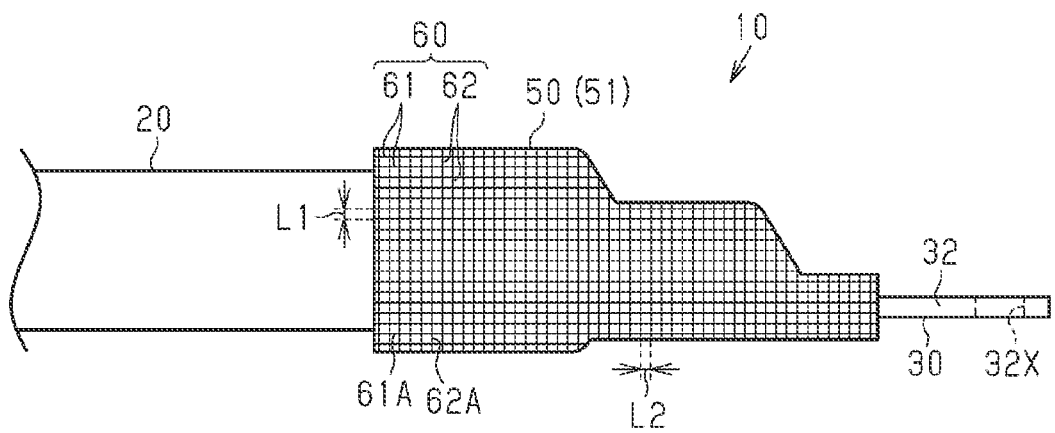
FIG. 3 is a schematic side view showing a wire harness according to an embodiment of the present disclosure.

As shown in FIGS. 2 and 3, the wire harness 10 includes a connection terminal 30 made of metal and connected to the end portion of the electric wire 20, and a contraction tube 50 that covers a connection portion 40 (connection) between the electric wire 20 and the connection terminal 30.

Configuration of Connection Terminal 30

As shown in FIG. 2, the connection terminal 30 includes an electric wire connection portion 31 that is connected to the end portion of the electric wire 20 and a terminal connection portion 32 that is connected to a mating terminal (not illustrated). The connection terminal 30 is a single component obtained by integrally forming the electric wire connection portion 31 and the terminal connection portion 32 in a continuous manner, for example. A metal material such as copper, copper alloy, aluminum, aluminum alloy, or stainless steel can be used as the material of the connection terminal 30. Surface treatment such as silver plating, tin plating, or aluminum plating may be performed on the connection terminal 30 according to the type of metal that forms the connection terminal 30 or a use environment. The connection terminal 30 can be formed by pressing a metal plate that has an excellent conductive property, for example. Note that examples of the mating terminal that is connected to the terminal connection portion 32 can include a busbar, a terminal portion of an electric device, and a terminal of another electric wire.

Configuration of Electric Wire Connection Portion 31

The electric wire connection portion 31 is electrically connected to the end portion of the electric wire 20. The electric wire connection portion 31 is connected to the end portion of the core wire 21 exposed from the insulating coating 22, for example. The electric wire connection portion 31 is connected to the core wire 21 through pressure bonding, ultrasonic welding, or the like. Accordingly, the electric wire connection portion 31 and the core wire 21 are electrically connected.

Configuration of Terminal Connection Portion 32

The terminal connection portion 32 is formed to be exposed from the contraction tube 50 and protrudes outward of the contraction tube 50. The terminal connection portion 32 is formed in a flat plate shape, for example. A through hole 32X into which a fixation device such as a screw (not illustrated) is inserted is formed in the terminal connection portion 32, for example. The through hole 32X extends through the terminal connection portion 32 in the thickness direction thereof, for example. Note that the terminal connection portion 32 may also be formed in another shape such as a plate shape or bar shape that does not have the through hole 32X.

Configuration of Contraction Tube 50

The contraction tube 50 is formed in an elongated tubular shape, for example. The contraction tube 50 is formed to cover the connection portion 40 between the electric wire connection portion 31 and the core wire 21, for example. The contraction tube 50 is formed to cover the core wire 21 exposed from the insulating coating 22, for example. The contraction tube 50 is formed to cover a region reaching from the end portion of the insulating coating 22 to the connection portion 40, for example. The contraction tube 50 is formed to cover the electric wire connection portion 31 positioned on the terminal connection portion 32 side relative to the connection portion 40, for example. One end portion of the contraction tube 50 covers the outer circumferential surface of the end portion of the insulating coating 22, and the other end portion of the contraction tube 50 covers the outer circumferential surface of the electric wire connection portion 31 of the connection terminal 30, for example. The contraction tube 50 is formed to surround the outer circumferential surface of the end portion of the insulating coating 22 and the outer circumference of the connection portion 40 over their entire circumference.

Specific Configuration of Contraction Tube 50

The contraction tube 50 according to this embodiment has a tubular heat-contraction tube 51 and an adhesive layer 52 formed on the inner circumferential surface of the heat-contraction tube 51.

Figure 4A:
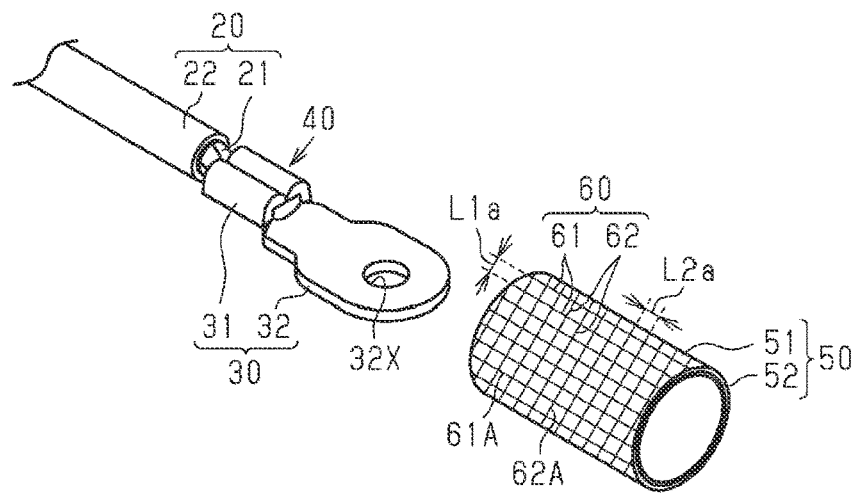
FIG. 4A is a schematic perspective view showing a manufacturing method of a wire harness according to an embodiment of the present disclosure.

As shown in FIG. 4A, the heat-contraction tube 51 is formed into a tube (here, cylindrical body) in advance before the connection portion 40 is disposed inside the contraction tube 50, for example. A resin member shaped into a very narrow tubular shape through extrusion molding is stretched into a wide tubular shape in a state of being heated, and is then cooled, for example, thereby obtaining the heat-contraction tube 51. The heat-contraction tube 51 obtained in this manner has a shape memory property according to which, when heated, the heat-contraction tube 51 contracts into the narrow tubular shape that has the shape of the heat-contraction tube 51 before it is stretched. A synthetic resin such as a polyolefin-based resin, a polyester-based resin, a nylon-based resin, a silicon-based resin, or a fluorine resin can be used as the material of the heat-contraction tube 51. A single material or a combination of two or more materials can be used as the material of the heat-contraction tube 51 as appropriate.

In a state where the connection portion 40 is not disposed inside the contraction tube 50, the adhesive layer 52 is formed to have a uniform thickness on the inner circumferential surface of the heat-contraction tube 51, and is formed in a tubular (here, cylindrical) shape, for example. The adhesive layer 52 is formed on the inner circumferential surface of the heat-contraction tube 51 over the entire circumferential direction and over the entire length in the lengthwise direction, for example. In the state where the connection portion 40, the end portion of the insulating coating 22, and the like are not disposed inside the adhesive layer 52, for example, the internal diameter of the adhesive layer 52 is larger than the external diameter of the connection portion 40 and the external diameter of the insulating coating 22. A thermoplastic adhesive can be used as the adhesive layer 52, for example. Modified olefin-based or polyester-based hot-melt adhesive can be used as the adhesive layer 52, for example. The material of the adhesive layer 52 is preferably the same type of resin material as the material that makes up the insulating coating 22, for example. In addition, the material of the adhesive layer 52 is preferably the same type of resin material of as the material that makes up the heat-contraction tube 51, for example. A single material or a combination of two or more materials can be used as the material of the adhesive layer 52 as appropriate. Note that the adhesive layer 52 is a layer formed as a result of being melted by heat, and being solidified as it is cooled, for example.

Next, the structure of the heat-contraction tube 51 that has heat-contracted and the adhesive layer 52 will be described with reference to FIG. 2.

As shown in FIG. 2, the heat-contraction tube 51 is formed to cover a region reaching from the end portion of the insulating coating 22 to the connection portion 40, for example. The heat-contraction tube 51 is formed to cover a region reaching from the end portion of the insulating coating 22 to the electric wire connection portion 31 positioned on the terminal connection portion 32 side relative to the connection portion 40, for example. The heat-contraction tube 51 is formed to surround the outer circumferential surface of the end portion of the insulating coating 22 and the outer circumferential surface of the connection portion 40, over the entire circumferential direction thereof, for example. The heat-contraction tube 51 is formed to surround the electric wire connection portion 31 over the entire circumferential direction thereof, for example. The heat-contraction tube 51 has a step formed therein along a step that is formed by the outer circumferential surface of the insulating coating 22, the core wire 21 exposed from the insulating coating 22, the connection portion 40, and the electric wire connection portion 31, for example. The heat-contraction tube 51 is formed such that the external diameter of a portion thereof that covers the connection portion 40 is smaller than the external diameter of a portion thereof that covers the outer circumferential surface of the insulating coating 22, for example. The heat-contraction tube 51 is formed such that the external diameter of a portion thereof that covers the electric wire connection portion 31 positioned on the terminal connection portion 32 side relative to the connection portion 40 is smaller than the external diameter of a portion thereof that covers the connection portion 40, for example.

One end in the lengthwise direction of the heat-contraction tube 51 is adhered to the outer circumferential surface of the end portion of the insulating coating 22 over the entire circumferential direction thereof, using the adhesive layer 52, for example. The adhesive layer 52 at the one end in the lengthwise direction of the contraction tube 50 is adhered to the outer circumferential surface of the end portion of the insulating coating 22 over the entire circumferential direction thereof such that no gap is created, and is adhered to the inner circumferential surface of the heat-contraction tube 51 over the entire circumferential direction thereof such that no gap is created therebetween, for example. In addition, the other end in the lengthwise direction of the heat-contraction tube 51 is adhered to the outer circumferential surface of the electric wire connection portion 31 over the entire circumferential direction thereof, using the adhesive layer 52, for example. The adhesive layer 52 at the other end in the lengthwise direction of the contraction tube 50 is adhered to the outer circumferential surface of the electric wire connection portion 31 over the entire circumferential direction thereof such that no gap is created, and is adhered to the inner circumferential surface of the heat-contraction tube 51 over the entire circumferential direction thereof such that no gap is created, for example. Accordingly, a gap between the heat-contraction tube 51 and the insulating coating 22 is closed, and a gap between the heat-contraction tube 51 and the electric wire connection portion 31 is closed. Therefore, it is possible to keep liquid such as water from invading the contraction tube 50 from the two ends in the lengthwise direction of the contraction tube 50. As a result, it is possible to keep liquids from invading the connection portion 40 between the core wire 21 of the electric wires 20 and the electric wire connection portion 31 of the connection terminal 30. That is to say, the contraction tube 50 according to this embodiment has an insulation protection function of insulating and protecting the connection portion 40, and a waterproofing function of making the connection portion 40 waterproof.

In an intermediate portion in the lengthwise direction of the contraction tube 50, the adhesive layer 52 is formed to fill a gap formed by the inner circumferential surface of the heat-contraction tube 51, the core wire 21, and the outer circumferential surface of the electric wire connection portion 31, for example. Note that, in the intermediate portion in the lengthwise direction of the contraction tube 50, the adhesive layer 52 may also be formed along the inner circumferential surface of the heat-contraction tube 51. In addition, the adhesive layer 52 may also be formed to protrude outward from the end in the lengthwise direction of the heat-contraction tube 51.

As shown in FIG. 3, a determination pattern 60 according to which it is possible to determine the contraction rates of the heat-contraction tube 51 (the contraction tube 50) is printed on the outer circumferential surface of the heat-contraction tube 51. The determination pattern 60 according to this embodiment includes a first determination pattern 61 according to which it is possible to determine the contraction rate in the radial direction of the heat-contraction tube 51, and a second determination pattern 62 according to which it is possible to determine the contraction rate in the lengthwise direction of the heat-contraction tube 51.

The first determination pattern 61 is a pattern in which a plurality of first patterns 61A extending along the lengthwise direction of the heat-contraction tube 51 are printed at equal intervals along the circumferential direction of the heat-contraction tube 51, for example. Regarding the first determination pattern 61, it is possible to determine the contraction rate in the radial direction of the heat-contraction tube 51 by determining an extent to which a distance L1 between adjacent first patterns 61A reduces after the heat-contraction tube 51 has contracted, compared with the distance L1 before the contraction.

The second determination pattern 62 is a pattern in which a plurality of second patterns 62A extending along the circumferential direction of the heat-contraction tube 51 are printed at equal intervals along the lengthwise direction of the heat-contraction tube 51, for example. Regarding the second determination pattern 62, it is possible to determine the contraction rate in the lengthwise direction of the heat-contraction tube 51 by determining an extent to which a distance L2 between adjacent second patterns 62A reduces after the heat-contraction tube 51 has contracted, compared with the distance L2 before the contraction.

The determination pattern 60 according to this embodiment is formed in an overall lattice shape due to the first determination pattern 61 and the second determination pattern 62. Note that the determination pattern 60 (the first determination pattern 61 and the second determination pattern 62) is printed on the outer circumferential surface of the heat-contraction tube 51, for example, using laser or through printing.

Manufacturing Method of Wire Harness 10

Next, a manufacturing method of the wire harness 10 will be described with reference to FIGS. 4A to 4C.

First, in the process shown in FIG. 4A, an electric wire 20 in which an end portion of the core wire 21 is electrically connected to the electric wire connection portion 31 of the connection terminal 30, and an uncontracted contraction tube 50 are prepared. In the illustrated example, the electric wire connection portion 31 is connected to the core wire 21 through pressure bonding. The uncontracted contraction tube 50 has a layered structure that includes the tubular (here, cylindrical) heat-contraction tube 51 and the thermoplastic adhesive layer 52 formed on the inner circumferential surface of the heat-contraction tube 51. This uncontracted contraction tube 50 is provided with an internal diameter that allows the insulating coating 22, the connection portion 40, and the electric wire connection portion 31 to be housed therein. Here, the determination pattern 60, which includes the first determination pattern 61 and the second determination pattern 62, is printed on the outer circumferential surface of the heat-contraction tube 51. The first determination pattern 61 on the uncontracted heat-contraction tube 51 is set such that the distance between adjacent first patterns 61A is a distance L1a, for example. The second determination pattern 62 on the uncontracted heat-contraction tube 51 is set such that the distance between adjacent second patterns 62A is a distance L2a, for example.

Figure 4B:
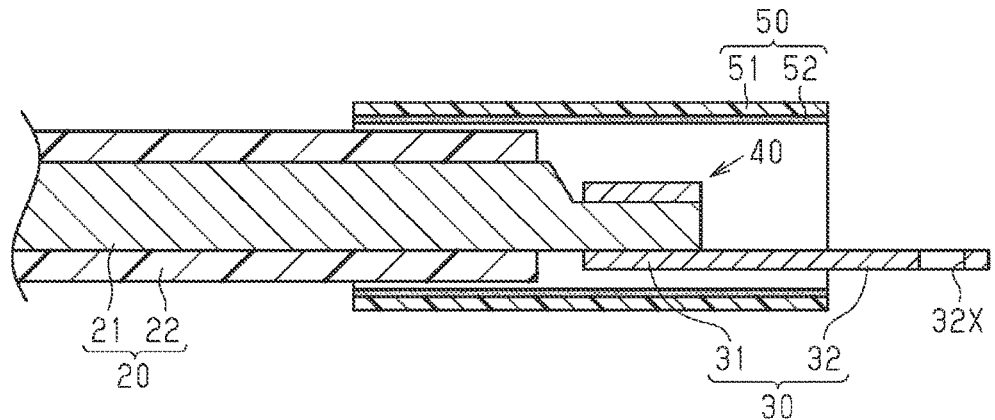
FIG. 4B is a schematic cross-sectional view showing a manufacturing method of a wire harness according to an embodiment of the present disclosure.

Next, in the process shown in FIG. 4B, the end portion of the electric wire 20 connected to the connection terminal 30 is inserted into the contraction tube 50. Specifically, the electric wire 20 connected to the connection terminal 30 is inserted into the contraction tube 50 such that the outer circumference of the end portion of the insulating coating 22, the outer circumference of the core wire 21 exposed from the insulating coating 22, the outer circumference of the connection portion 40, and the outer circumference of the electric wire connection portion 31 are surrounded by the contraction tube 50.

Next, the contraction tube 50 is subjected to heat treatment. The contraction tube 50 is, for example, heated by a heater or the like. In this heat treatment, for example, the contraction tube 50 is heated for a predetermined period of time at a heating temperature that is higher than the contraction temperature of the heat-contraction tube 51 and lower than the melting temperature of the heat-contraction tube 51 (for example, about 120 to 140° C.). As a result of this heat treatment, the heat-contraction tube 51 is contracted in the radial direction and the lengthwise direction thereof, and as a result of the thermoplastic adhesive layer 52 softening or melting, the adherence property of the adhesive layer 52 is exerted. Accordingly, the heat-contraction tube 51 is adhered to the outer circumferential surface of the end portion of the insulating coating 22 over the entire circumferential direction thereof using the adhesive layer 52 such that no gap is created, and is adhered to the outer circumferential surface of the electric wire connection portion 31 over the entire circumferential direction thereof using the adhesive layer 52 such that no gap is created. The above contracted contraction tube 50 can function as a waterproof member that makes the connection portion 40 waterproof.

Here, if the heat-contraction tube 51 is excessively contracted through heat treatment in the process, the problem may arise that, for example, the heat-contraction tube 51 is pressed against a corner or the like of the connection portion 40, and the heat-contraction tube 51 breaks. On the other hand, if contraction of the heat-contraction tube 51 due to heat treatment is insufficient, the heat-contraction tube 51 cannot be tightly adhered to the outer circumferential surface of the insulating coating 22 and the outer circumferential surface of the electric wire connection portion 31. Therefore, when contraction of the heat-contraction tube 51 is insufficient, the problem arises that desired waterproofing performance cannot be achieved in the heat-contraction tube 51.

In order to address this issue, conventionally, the contraction rate of the heat-contraction tube 51 has been secured only based on manufacturing conditions such as heating temperature and heating time in the heat treatment. However, with conventional methods, it is not possible to determine whether or not the actual contraction rate of the heat-contraction tube 51 is the desired contraction rate. Therefore, for example, when the contraction tube 50 is used as a waterproof member, a leakage inspection for evaluating whether or not the contraction tube 50 has the desired waterproofing performance needs to be performed on every wire harness 10 that has been manufactured. Therefore, in a conventional wire harness, a large number of manhours is required in order to guarantee the waterproof property of the contraction tube 50, and there has been the problem that the manufacturing cost increases.

Figure 4C:
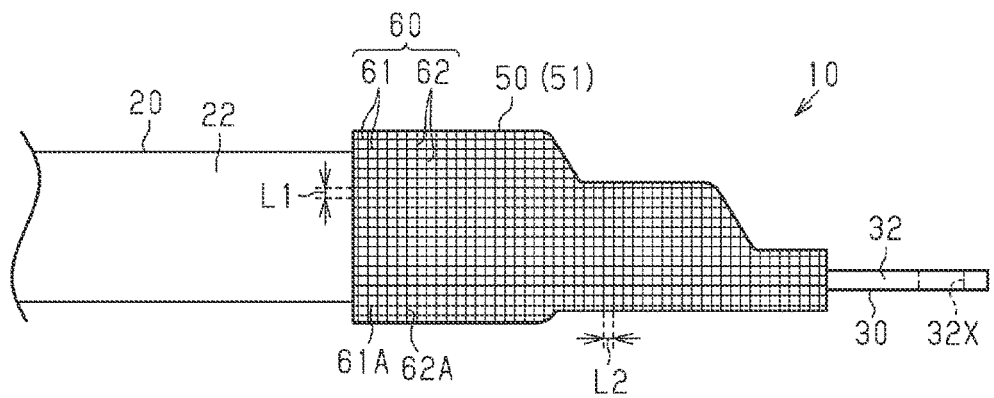
FIG. 4C is a schematic side view showing a manufacturing method of a wire harness according to an embodiment of the present disclosure.

In contrast, as shown in FIG. 4C, in the wire harness 10 according to this embodiment, a determination pattern 60 according to which it is possible to determine the contraction rate of the contraction tube 50 is printed on the outer circumferential surface of the heat-contraction tube 51 (the contraction tube 50). Therefore, the contraction rate of the contraction tube 50 can be determined based on the determination pattern 60 on the contracted contraction tube 50.

As shown in FIG. 4C, in the first determination pattern 61 on the contracted contraction tube 50, the distance between adjacent first patterns 61A is denoted by the distance L1, which is smaller than the distance Ma before contraction (see FIG. 4A). Accordingly, as the heat-contraction tube 51 contracts in the radial direction, in other words, as the internal diameter of the heat-contraction tube 51 is reduced, the distance between adjacent first patterns 61A reduces. In addition, in the second determination pattern 62 on the contracted contraction tube 50, the distance between adjacent second patterns 62A is denoted by the distance L2, which is smaller than the distance L2a before contraction (see FIG. 4A). That is to say, as the heat-contraction tube 51 contracts in the lengthwise direction, the distance between adjacent second patterns 62A is reduced. At this time, the contraction rate in the radial direction of the contraction tube 50 can be determined based on the ratio L1/L1a of the distance Ma in the first determination pattern 61 before contraction to the distance L1 in the first determination pattern 61 after contraction. In addition, the contraction rate in the lengthwise direction of the contraction tube 50 can be determined based on the ratio L2/L2a of the distance L2a in the second determination pattern 62 before contraction to the distance L2 in the second determination pattern 62 after contraction.

In this embodiment, the ratio L1/L1a and the ratio L2/L2a when the contraction tube 50 contracts at a desired contraction rate are obtained in advance through experiments or the like. At this time, if the distances L1a and L2a before contraction are set to certain values, it is possible to obtain, based on the ratios L1/L1a and L2/L2a obtained as described above, the distances L1 and L2 when the contraction tube 50 contracts at the desired contraction rate, in other words, appropriate ranges of the distances L1 and L2. Those appropriate ranges of the distances L1 and L2 can be used to determine whether or not the contracted contraction tube 50 through the above heat treatment has reached a desired contraction rate. Note that the "desired contraction rate" refers to a contraction rate at which the contracted contraction tube 50 can obtain the functionality that is demanded for the contraction tube 50 (here, the insulation protection function and the waterproofing function).

In the process for determining the contraction rate of the contraction tube 50, first, the distances L1 and L2 in the determination pattern 60 of the contracted contraction tube 50 through the above heat treatment are measured through visual examination, image analysis, or the like. Next, a determination is performed as to whether or not the measured distances L1 and L2 are included in the appropriate ranges obtained in advance. At this time, if the measured distances L1 and L2 are within the appropriate ranges, it can be determined that the contraction tube 50 has contracted at a desired contraction rate, and the contracted contraction tube 50 has the desired functionality (here, the insulation protection function and the waterproofing function). Thus, the insulation reliability and waterproof property in the connection portion 40 can be visually observed using the determination pattern 60. Furthermore, it is possible to determine whether or not the contraction rate of the contraction tube 50 is a desired contraction rate, using a simpler method than a leakage inspection, namely measurement of the distances L1 and L2, and thus it is possible to reduce manhours more than with a conventional method. Accordingly, it is possible to improve the assembly workability of the wire harness 10.

Note that, if the values of the measured distances L1 and L2 are larger than the appropriate ranges, it can be determined that the contraction rate of the contraction tube 50 is insufficient. In addition, if the values of the measured distances L1 and L2 are smaller than the appropriate ranges, it can be determined that the contraction rate of the contraction tube 50 is excessive.

Next, the operative effect of this embodiment will be described.

(1) A tubular contraction tube 50 that covers the connection portion between the core wire 21 of the electric wire 20 and the electric wire connection portion 31 of the connection terminal 30 is provided. A determination pattern 60, which includes a first determination pattern 61 according to which it is possible to determine the contraction rate in the radial direction of the contraction tube 50, is printed on the outer circumferential surface of the contraction tube 50.

According to this configuration, it is possible to, for example, visually or optically determine the contraction rate in the radial direction of the contraction tube 50 using the first determination pattern 61. Therefore, it is possible to easily perform a determination on the wire harness 10 in which the contraction rate in the radial direction of the contraction tube 50 is excessive and the wire harness 10 in which the contraction rate in the radial direction of the contraction tube 50 is insufficient, based on the first determination pattern 61. Accordingly, the insulation reliability and waterproof property in the connection portion 40 can be visually recognized using the first determination pattern 61, and thus a quality loss of the wire harness 10 can be suppressed. Furthermore, it is possible to omit a leak inspection or the like for evaluating the waterproof property of the contraction tube 50, and thus improve the assembly workability of the wire harness 10.

(2) The determination pattern 60 includes a second determination pattern 62 according to which it is possible to determine the contraction rate in the lengthwise direction of the contraction tube 50. According to this configuration, it is possible to determine the contraction rate in the lengthwise direction of the contraction tube 50, based on the second determination pattern 62. Therefore, it is possible to easily perform a determination on the wire harness 10 in which the contraction rate in the lengthwise direction of the contraction tube 50 is excessive and the wire harness 10 in which the contraction rate in the lengthwise direction of the contraction tube 50 is insufficient, based on the second determination pattern 62.

(3) The first determination pattern 61 is a pattern in which a plurality of first patterns 61A that extend along the lengthwise direction of the contraction tube 50 are printed at equal intervals along the circumferential direction of the contraction tube 50. The second determination pattern 62 is a pattern in which a plurality of second patterns 62A extending along the circumferential direction of the contraction tube 50 are printed at equal intervals along the lengthwise direction of the contraction tube 50.

According to this configuration, regarding the contracted contraction tube 50, it is possible to determine the contraction rate in the radial direction of the contraction tube 50 by measuring an extent to which the distance L1 between adjacent first patterns 61A reduces compared to the distance L1 before contraction. In addition, regarding the contracted contraction tube 50, it is possible to determine the contraction rate in the lengthwise direction of the contraction tube 50 by measuring an extent to which the distance L2 between adjacent second patterns 62A reduces compared to the distance L2 before contraction.

(4) The determination pattern 60 is printed over the entire outer circumferential surface of the contraction tube 50. According to this configuration, it is possible to determine the contraction rates of the contraction tube 50 over the entire circumferential direction and the entire length in the lengthwise direction thereof.

(5) The contraction tube 50 has a layered structure that includes the heat-contraction tube 51 and the adhesive layer 52 formed on the inner circumferential surface of the heat-contraction tube 51. According to this configuration, the adhesive layer 52 formed on the inner circumferential surface of the heat-contraction tube 51 makes it possible to improve the adhesiveness between the heat-contraction tube 51 and the insulating coating 22 and the adhesiveness between the heat-contraction tube 51 and the electric wire connection portion 31.

Other Embodiments

The above-described embodiment may be modified and implemented as described below. The above-described embodiment and the following modifications may be combined with each other and implemented as long as there is no technical contradiction.

The adhesive layer 52 of the contraction tube 50 according to the above embodiment may be omitted.

The waterproofing function of the contraction tube 50 according to the above embodiment may be omitted.

In the above embodiment, the contraction tube 50 that covers the connection portion 40 between the core wire 21 that is the first conductor and the connection terminal 30 that is the second conductor is embodied, but there is no limitation thereto.

Figure 5:
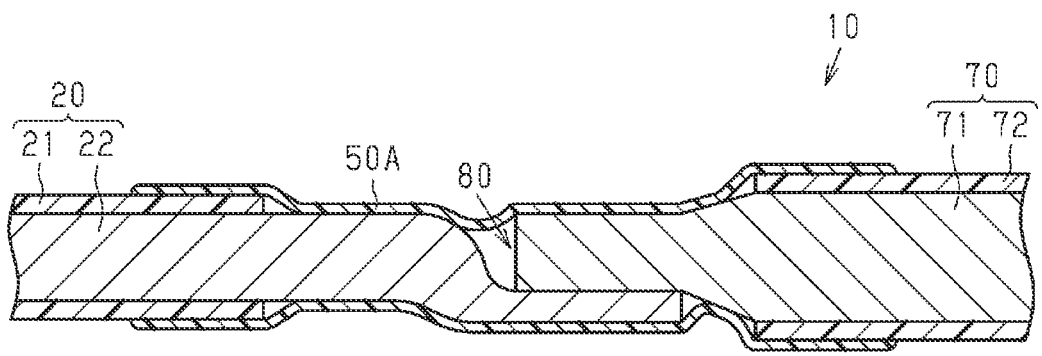
FIG. 5 is a schematic cross-sectional view showing a wire harness according to a modification.

As shown in FIG. 5, for example, the present disclosure may also be embodied with a contraction tube 50A that covers a connection portion 80 between the core wire 21 (first conductor) of the electric wire 20 and a core wire 71 (second conductor) of an electric wire 70. The wire harness 10 according to this modification includes the electric wire 20 and the electric wire 70, which are different in type, the connection portion 80 that electrically connects the electric wire 20 and the electric wire 70, and the contraction tube 50A that coats the connection portion 80. The wire harness 10 is formed by connecting the electric wire 20 and the electric wire 70 formed independently from the electric wire 20, in the lengthwise direction of the wire harness 10, for example.

The electric wire 70 includes the core wire 71 made of a conductor and an insulating coating 72 that coats the outer circumference of the core wire 71. A stranded wire, a columnar conductor, a tubular conductor, or the like can be used as the core wire 71, for example. A metal material such as a copper-based or aluminum-based material can be used as the material of the core wire 71, for example. The core wire 71 may be formed through extrusion molding, for example. In this modification, the core wire 21 of the electric wire 20 is a stranded wire, and the core wire 71 of the electric wire 70 is a single core wire.

The insulating coating 72 coats the outer circumferential surface of the core wire 71 over its entire circumferential direction, for example. The insulating coating 72 is formed of an insulation material such as a synthetic resin. A synthetic resin whose major component is a polyolefin-based resin such as cross-linked polyethylene or cross-linked polypropylene can be used as the material of the insulating coating 72, for example. A single material or a combination of two or more materials can be used as the material of the insulating coating 72, as appropriate. The insulating coating 72 may be formed by performing extrusion molding on the core wire 71, for example. In addition, a heat-contraction tube or a rubber tube can also be used as the insulating coating 72.

In the connection portion 80, the core wire 21 of the electric wires 20 and the core wire 71 of the electric wire 70 are joined. To be specific, at the end of the electric wire 20, the insulating coating 22 is stripped and the core wire 21 is exposed from the terminal of the electric wire 20 over a predetermined length range. In addition, at the end of the electric wire 70, the insulating coating 72 is stripped, and the core wire 71 is exposed from the terminal of the electric wire 70 over a predetermined length range. Also, at the connection portion 80, the core wire 71 exposed from the end of the insulating coating 72 is joined to the core wire 21 exposed from the end portion of the insulating coating 22. At the connection portion 80, the core wire 21 and the core wire 71 are overlapped and joined to each other in the radial direction (a direction that intersects the lengthwise direction of the core wires 21 and 71), for example. Note that there is no particular limitation to the method for connecting the core wire 21 and the core wire 71. Ultrasonic welding, laser welding, or the like can be used as the method for connecting the core wire 21 and the core wire 71.

The contraction tube 50A is formed in an elongated tubular shape, for example. The contraction tube 50A may be a heat-contraction tube, for example. The contraction tube 50A according to this modification is a member that has a single layer. That is to say, the contraction tube 50A according to this modification does not have an adhesive layer.

A thermoplastic synthetic resin can be used as the material of the contraction tube 50A, for example. A thermoplastic resin that has a cross-linked structure can be used as the thermoplastic synthetic resin, for example. A thermoplastic resin that has a cross-linked structure achieved as a result of cross-linking through electron beam irradiation can be used as the thermoplastic synthetic resin, for example. A synthetic resin whose major component is a polyolefin-based resin such as cross-linked polyethylene or cross-linked polypropylene can be used as the material of the contraction tube 50A, for example. The material of the contraction tube 50A is preferably the same type of resin material as the material that makes up the insulating coatings 22 and 72. A single material or a combination of two or more materials can be used as the material of the contraction tube 50A as appropriate.

The contraction tube 50A is formed to cover the connection portion 80 between the core wire 21 and the core wire 71. The contraction tube 50A is formed to cover the core wire 21 exposed from the insulating coating 22 and the core wire 71 exposed from the insulating coating 72, for example. The contraction tube 50A is formed to surround the outer circumference of the electric wire 20 and the outer circumference of the electric wire 70, over the entire circumferential direction thereof. The contraction tube 50A is formed to extend between the end portion of the insulating coating 22 of the electric wire 20 and the end portion of the insulating coating 72 of the electric wire 70, for example. One end portion of the contraction tube 50A coats the outer circumferential surface at the end of the insulating coating 22, and the other end portion of the contraction tube 50A coats the outer circumferential surface at the end of the insulating coating 72, for example. The inner circumferential surface of the one end portion of the contraction tube 50A is adhered to the outer circumferential surface of the insulating coating 22 over the entire circumferential direction thereof such that no gap is created, for example. The inner circumferential surface of the other end portion of the contraction tube 50A is adhered to the outer circumferential surface of the insulating coating 72 over the entire circumferential direction thereof such that no gap is created, for example. The inner circumferential surface at the one end portion of the contraction tube 50A is adhered to the outer circumferential surface of the insulating coating 22 through welding, and the inner circumferential surface of the other end portion of the contraction tube 50A is adhered to the outer circumferential surface of the insulating coating 72 through welding, for example. Here, for example, ultrasonic welding, vibration welding, high-frequency welding, laser welding, infrared ray welding, friction welding, hot plate welding, or hot-air welding can be used as welding (heat welding).

When the contraction tube 50A is contracted, for example, in a state where the uncontracted contraction tube 50A is disposed at a position surrounding the connection portion 80, the contraction tube 50A is heated by a heater or the like. As a result of such heating, the contraction tube 50A, which is a heat-contraction tube, contracts in the radial direction and the lengthwise direction to be tightly adhered to the outer circumferential surfaces of the insulating coatings 22 and 72, and the inner circumferential surface of the contraction tube 50A made of a thermoplastic resin is adhered to the outer circumferential surfaces of the insulating coatings 22 and 72 through welding. That is to say, the inner circumferential surface of the contraction tube 50A is adhered to the outer circumferential surfaces of the insulating coatings 22 and 72 by heat for contracting the contraction tube 50A. At this time, if the contraction tube 50A and the insulating coatings 22 and 72 are formed of the same type of synthetic resin, the contraction tube 50A and the insulating coatings 22 and 72 are easily bonded to each other at the molecular level, and thus can be solidly joined. According to this configuration, a gap between the contraction tube 50A and the insulating coating 22 is closed, and a gap between the contraction tube 50A and the insulating coating 72 is closed. Accordingly, it is possible to keep liquids from invading the contraction tube 50A from between the contraction tube 50A and the insulating coating 22 and between the contraction tube 50A and the insulating coating 72.

Figure 6:
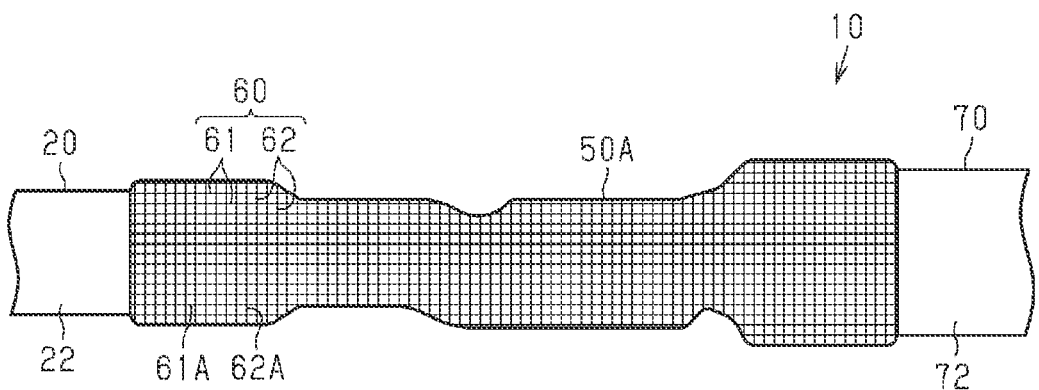
FIG. 6 is a schematic side view showing a wire harness according to a modification.

As shown in FIG. 6, the determination pattern 60 according to which it is possible to determine the contraction rate of the contraction tube 50A is printed on the outer circumferential surface of the contraction tube 50A. The determination pattern 60 includes the first determination pattern 61 according to which it is possible to determine the contraction rate in the radial direction of the contraction tube 50A and the second determination pattern 62 according to which it is possible to determine the contraction rate in the lengthwise direction of the contraction tube 50A. It is possible to achieve effects similar to those of (1) to (4) in the above embodiment by providing such a determination pattern 60.

In the modification shown in FIG. 5, a combination of the core wire 21 and the core wire 71 is not particularly limited. Both the core wire 21 and the core wire 71 may also be a stranded wire, for example. Both the core wire 21 and the core wire 71 may also be a single core wire.

The structure of the contraction tube 50A shown in FIG. 5 may also be changed to a layered structure that includes a heat-contraction tube and an adhesive layer formed on the inner circumferential surface of the heat-contraction tube.

There is no particular limitation regarding the shape of the determination pattern 60 on the contraction tube 50 according to the above embodiment. That is to say, as long as it is possible to determine the contraction rates in the radial direction and the lengthwise direction of the contraction tube 50 based on the shape of the determination pattern 60, there is no particular limitation regarding the shape of the determination pattern 60.

Figure 7:
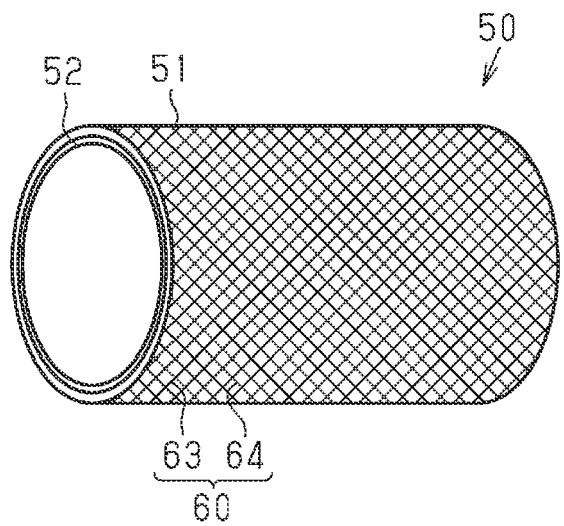
FIG. 7 is a schematic perspective view showing a contraction tube according to modification.

As shown in FIG. 7, for example, the shape of the determination pattern 60 may also be changed. That is to say, the shape of the determination pattern 60 may be changed to a shape in which a plurality of patterns 63 extending along a first direction inclined relative to both the circumferential direction and the lengthwise direction of the contraction tube 50 are provided at equal intervals along a second direction orthogonal to the first direction, and a plurality of patterns 64 extending along the second direction are provided at equal intervals along the first direction. The determination pattern 60 in this case is formed in an overall lattice shape due to the plurality of the patterns 63 and the plurality of the patterns 64.

Figure 8:
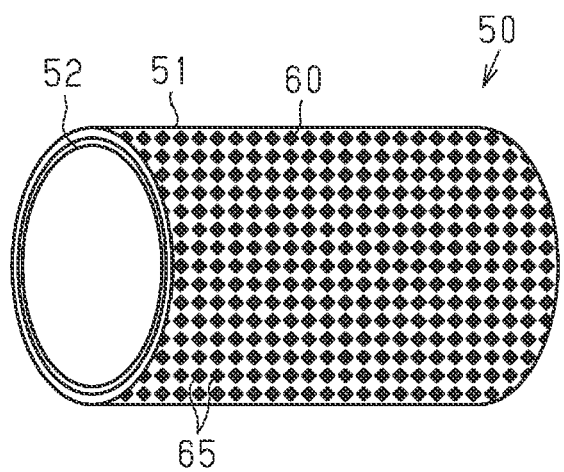
FIG. 8 is a schematic perspective view showing a contraction tube according to a modification.

As shown in FIG. 8, the shape of the determination pattern 60 may also be changed, for example. That is to say, the shape of the determination pattern 60 may be changed to a shape in which a plurality of dot patterns 65 are aligned. The shape of the determination pattern 60 may also be changed, for example, to a shape in which the plurality of dot patterns 65 are provided at equal intervals along the circumferential direction of the contraction tube 50, and the plurality of dot patterns 65 are provided at equal intervals along the lengthwise direction of the contraction tube 50. In the illustrated example, the dot patterns 65 are formed in a rhombic shape. The shape of each dot pattern 65 may also be changed to a shape other than a rhombic shape (for example, a circular shape).

The shape of the determination pattern 60 may also be changed, for example, such that the determination pattern 60 before contraction is an intentionally distorted image or letters, and, when the contraction tube 50 is contracted at a desired contraction rate, a proper image or letters for which the above distortion is eliminated are obtained. According to this configuration, it is possible to easily determine whether or not the contraction rate of the contraction tube 50 is a desired contraction rate, based on the determination pattern 60 after contraction.

The determination pattern 60 according to the above embodiment is embodied as a pattern according to which it is possible to determine the contraction rates in the radial direction and the lengthwise direction of the contraction tube 50, but there is no limitation thereto. The determination pattern 60 may also be changed to, for example, a pattern according to which it is possible to determine only the contraction rate in the radial direction of the contraction tube 50.

Figure 9:
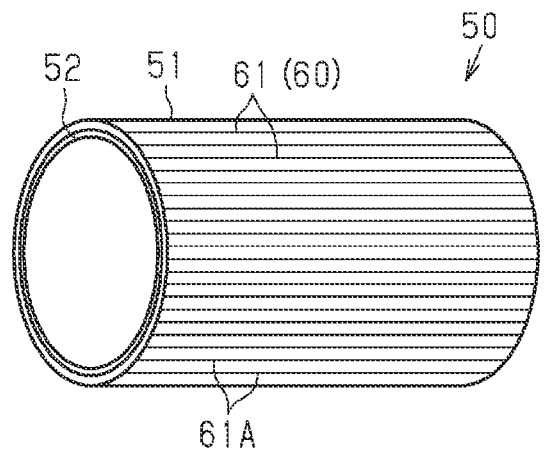
FIG. 9 is a schematic perspective view showing a contraction tube according to a modification.

As shown in FIG. 9, for example, a configuration may also be adopted in which only the first determination pattern 61 according to which it is possible to determine the contraction rate in the radial direction of the contraction tube 50 is printed on the outer circumferential surface of the contraction tube 50 (the heat-contraction tube 51).

In the above embodiment, the determination pattern 60 is printed on the entire outer circumferential surface of the contraction tube 50 (the heat-contraction tube 51), but there is no limitation thereto.

Figure 10:
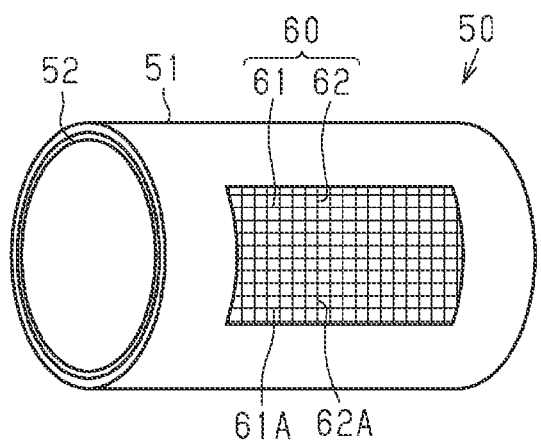
FIG. 10 is a schematic perspective view showing a contraction tube according to a modification.

As shown in FIG. 10, for example, the determination pattern 60 may also be partially printed on a portion of the outer circumferential surface of the contraction tube 50.

An electromagnetic shield member may also be provided inside the exterior member 25 according to the above embodiment. The electromagnetic shield member is provided between the inner circumferential surface of the exterior member 25 and the outer circumferential surface of the electric wires 20, for example. A flexible braided wire or a piece of metal foil may be used as the electromagnetic shield member, for example.

According to the above embodiment, the number of electric wires 20 of the wire harness 10 is not specifically limited and may be changed depending on the specifications of the vehicle V. A configuration may also be adopted in which low-voltage electric wires for connecting a low-voltage battery and various low-voltage devices (a lamp, a car audio, etc.) are added as an electric wire of the wire harness 10, for example.

The positional relationship between the inverter 11 and the high-voltage battery 12 in the vehicle V is not limited to that in the above-described embodiment, and may be changed according to the vehicle configuration as appropriate.

Although the inverter 11 and the high-voltage battery 12 are employed as electric devices connected by the electric wire 20 in the above-described embodiment, the present disclosure is not limited thereto. For example, the present disclosure may also be applied to an electric wire that connects the inverter 11 and a motor for driving the wheels to each other. That is to say, the present disclosure is applicable to whatever electrically connects electric devices mounted in the vehicle to each other.

The outer circumferential surface of the contraction tube may include a determination pattern and a non-determination-pattern portion that is different from the determination pattern. The determination pattern may also be referred to as a "printed portion" of the contraction tube, and the non-determination-pattern portion may also be referred to as a "non-printed" portion of the contraction tube. The determination pattern may be formed of a material that can be visually or optically detected. The determination pattern may have a first optical property, and the non-determination-pattern portion may have a second optical property that is different from the first optical property. The determination pattern may be different from the non-determination-pattern portion in reflectance or absorptance for light of a predetermined wavelength, for example.

The embodiments disclosed herein are to be considered as illustrative and non-limiting in all aspects. The scope of the present disclosure is indicated not by the above-stated meanings but by the claims, and all changes that come within the meaning and range of equivalency of the claims are intended to be embraced therein.

The invention claimed is:

1. A wire harness comprising:
   a first conductor;
   a second conductor electrically connected to the first conductor; and
   a tubular contraction tube that covers a connection between the first conductor and the second conductor, wherein:
   a determination pattern is printed on an outer circumferential surface of the contraction tube,
   the determination pattern includes a first determination pattern that allows a first contraction rate in a radial direction of the contraction tube to be determined, and
   the first contraction rate in the radial direction of the contraction tube is determined based on a first ratio of a distance in the first determination pattern before contraction to a distance in the first determination pattern after contraction.

2. The wire harness according to claim 1, wherein the determination pattern is printed on the entire outer circumferential surface of the contraction tube.

3. The wire harness according to claim 1, wherein:
   the first conductor is a core wire of an electric wire that includes the core wire and an insulating coating that coats an outer circumference of the core wire,
   the second conductor is a connection terminal made of metal,
   the core wire exposed from the insulating coating is electrically connected to the connection terminal, and
   the contraction tube is formed to cover a region reaching from the connection between the core wire and the connection terminal to an end of the insulating coating.

4. The wire harness according to claim 1, wherein the contraction tube includes a layered structure that includes a heat-contraction tube and an adhesive layer formed on an inner circumferential surface of the heat-contraction tube.

5. The wire harness according to claim 1, wherein the determination pattern includes a second determination pattern that allows a second contraction rate in a lengthwise direction of the contraction tube to be determined.

6. The wire harness according to claim 5, wherein:
   the first determination pattern is a pattern in which a plurality of first patterns extending along the lengthwise direction of the contraction tube are printed at equal intervals along a circumferential direction of the contraction tube, and
   the second determination pattern is a pattern in which a plurality of second patterns extending along the circumferential direction of the contraction tube are printed at equal intervals along the lengthwise direction of the contraction tube.

7. The wire harness according to claim 1, wherein:
   the first conductor is a first core wire of a first electric wire that includes the first core wire and a first insulating coating that coats an outer circumference of the first core wire,
   the second conductor is a second core wire of a second electric wire that includes the second core wire and a second insulating coating that coats an outer circumference of the second core wire,
   the first core wire exposed from an end of the first insulating coating and the second core wire exposed from an end of the second insulating coating are electrically connected to each other, and
   the contraction tube is formed to cover a region reaching from the end of the first insulating coating to the end of the second insulating coating.

8. The wire harness according to claim 7, wherein:
   an inner circumferential surface of one end of the contraction tube is adhered to an outer circumferential surface of the end of the first insulating coating through welding, and
   an inner circumferential surface of the other end of the contraction tube is adhered to an outer circumferential surface of the end of the second insulating coating through welding.

* * * * *